United States Patent
Schroth

(10) Patent No.: US 11,985,209 B2
(45) Date of Patent: May 14, 2024

(54) METHOD FOR STORING AND METHOD FOR DELIVERING AT LEAST ONE PIECE OF DATA, CORRESPONDING COMPUTER PROGRAM PRODUCTS AND DEVICES

(71) Applicant: MERCK PATENT GMBH, Darmstadt (DE)

(72) Inventor: Dieter Schroth, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/920,530

(22) PCT Filed: Jun. 1, 2021

(86) PCT No.: PCT/EP2021/064606
§ 371 (c)(1),
(2) Date: Oct. 21, 2022

(87) PCT Pub. No.: WO2021/245047
PCT Pub. Date: Dec. 9, 2021

(65) Prior Publication Data
US 2023/0156097 A1      May 18, 2023

(30) Foreign Application Priority Data
Jun. 4, 2020 (DE) .................... 10 2020 003 383.0

(51) Int. Cl.
*H04L 67/5681* (2022.01)
*H04B 7/185* (2006.01)

(52) U.S. Cl.
CPC ..... *H04L 67/5681* (2022.05); *H04B 7/18513* (2013.01)

(58) Field of Classification Search
CPC .......................... H04B 7/18513–18532; H04B 7/18576–18591
See application file for complete search history.

(56) References Cited

U.S. PATENT DOCUMENTS

| 5,619,695 A * | 4/1997 | Arbabi ................. G06F 9/4881 718/100 |
| 6,879,808 B1 | 4/2005 | Nations et al. |

(Continued)

FOREIGN PATENT DOCUMENTS

| WO | 2002041527 A1 | 5/2002 |
| WO | 2017117589 A1 | 7/2017 |
| WO | 2017117591 A1 | 7/2017 |

OTHER PUBLICATIONS

International Search report PCT/EP2021/064606 dated Oct. 11, 2021 (pp. 1-4).

*Primary Examiner* — Jonathan A Bui
(74) *Attorney, Agent, or Firm* — Millen, White, Zelano & Branigan P.C.; William F. Nixon

(57) ABSTRACT

A method is proposed for storing at least one piece of data representative of a content available at a content server connected to a constellation of communication satellites. Such method comprises:

intercepting (S200) at least one request for the content transmitted by at least one terminal equipment connected to the constellation of communication satellites;

determining (S210), based on the at least one request, a context wherein the content is required by the at least one terminal;

downloading (S220) the at least one piece of data from the content server at time slots function of the context; and storing (S230) in a data storage device the at downloaded least one piece of data for subsequent delivery to a given terminal.

15 Claims, 2 Drawing Sheets

(56) References Cited

U.S. PATENT DOCUMENTS

| | | | |
|---|---|---|---|
| 8,955,055 B1* | 2/2015 | Bogdanovic | G06F 21/85 |
| | | | 726/4 |
| 9,363,308 B2 | 6/2016 | Sebastian et al. | |
| 9,929,795 B2 | 3/2018 | Michel et al. | |
| 10,601,944 B2 | 3/2020 | Su et al. | |
| 10,609,175 B2 | 3/2020 | Su et al. | |
| 11,201,939 B1* | 12/2021 | Mokashi | H04L 67/568 |
| 2012/0131629 A1* | 5/2012 | Shrum, Jr. | H04N 21/26233 |
| | | | 725/115 |
| 2014/0254373 A1* | 9/2014 | Varma | H04W 40/36 |
| | | | 370/235 |
| 2018/0034786 A1* | 2/2018 | Srinivasan | H04L 63/10 |
| 2019/0132413 A1* | 5/2019 | Don | H04N 21/44209 |
| 2019/0273802 A1 | 9/2019 | Luft | |
| 2020/0007226 A1 | 1/2020 | Takagi et al. | |
| 2021/0409110 A1* | 12/2021 | Chakraborty | H04B 7/18513 |

\* cited by examiner

METHOD FOR STORING AND METHOD FOR DELIVERING AT LEAST ONE PIECE OF DATA, CORRESPONDING COMPUTER PROGRAM PRODUCTS AND DEVICES

1. FIELD OF THE DISCLOSURE

The field of the disclosure is that of satellite communication.

More specifically, the disclosure relates to methods for storing and for delivering content (e.g. a multimedia content, a video content, etc.) to a terminal equipment through satellite communication.

The disclosure can be of interest in any field where such content has to be delivered to a user terminal equipment through satellite communication. This is the case for instance in the context of satellite constellations for providing internet to end users.

2. TECHNOLOGICAL BACKGROUND

In the field of telecommunications, the concept of wireless global coverage is of the utmost importance. However, real global coverage can only be achieved by satellite systems. Until recently, the satellites were in geostationary orbit and their high altitude could not allow real-time communication such as cellular networks. The development of LEO (for "Low Earth Orbit") satellite constellations seems to overcome this limit. In particular, the next frontier for 3GPP (for "3rd Generation Partnership Project") 5G and post-5G networks towards truly ubiquitous connectivity is the use of LEO constellations to support the three 5G use cases: enhanced mobile broadband (eMBB), massive machine-type communications (mMTC), and ultra-reliable low-latency communications (URLLC).

However, LEO satellite systems have specific characteristics that could affect their use as part of an internet network. For instance, LEO satellite systems still exhibit a remaining latency that can be high in view of some applications and a relatively low data rate. Furthermore, it can be anticipated a continuously rising internet data. Consequently, because, on one hand, satellites have limited data rates and, on the other hand, more and more user terminals will connect to them for accessing various content available in the internet, a bottleneck will arise. In other words, a limitation in the effective data rate available for the user terminals on the ground is inalienable, thus degrading the user experience.

There is thus a need for a method for improving the experience of the user of a terminal accessing a content available on a content server in the context of limited bandwidth when the communication link between the terminal and the content server involves a satellite of a constellation of satellites, e.g. a LEO constellation.

3. SUMMARY

A particular aspect of the present disclosure relates to a method for storing at least one piece of data representative of a content (e.g. a multimedia content, a video content, etc.) available at a content server connected to a constellation of communication satellites. Such method comprises:

intercepting at least one request for the content transmitted by at least one terminal equipment connected to the constellation of communication satellites, the at least one request being transmitted to a satellite of the constellation of communication satellites;

determining, based on the at least one request, a context wherein the content is required by the at least one terminal;

downloading the at least one piece of data from the content server at time slots function of the context; and storing in a data storage device the at least one piece of data downloaded from the content server for subsequent delivery to a given terminal upon request.

Thus, the present disclosure proposes a new and inventive solution for improving the experience of the user of a terminal accessing a content on a content server when the communication link between the terminal and the content server involves a satellite of a constellation of satellites (e.g. a constellation of satellites dedicated to a global coverage for internet access on earth).

More particularly, the inspection of the requests made for a given content allows determining the context wherein such content is required by users. For instance, such context is representative of the time such content is usually required (e.g. what time of the day for a daily TV show, etc.), or in which geographical location on earth the content is required (e.g. for a content in a given language, for a sport event that involves national teams, etc.). Such context allows anticipating the needs for the content and thus downloading the content in the data storage device in anticipation, e.g. during time slots where there is spare bandwidth. Such data storage device can be implemented for instance in the satellite that receives the request, or on earth e.g. in a core network the terminal is connected to.

Doing so, saturation of the communication channels between, on one hand, the given terminal and the satellite or, on the other hand, between the content server and the satellite, is avoided or at least reduced during a subsequent access to the content. Furthermore, the latency for accessing the content is reduced. The user experience is thus improved.

In some embodiments, the context comprises time information representative of when the content is required by the at least one terminal. The at least one piece of data is downloaded from the content server at time slots with available communication bandwidth in a forward communication link between the server and the satellite and/or in a return communication link between the satellite and the at least one terminal when the time information is representative that the content is required by the at least one terminal at time slots with saturation of the forward communication link and/or in the return communication link.

Thus, the load of the communication channels is averaged in time.

In some embodiments, the time information is determined based on a time when the at least one request is intercepted.

Thus, the time information is easily determined, e.g. by performing a statistic on the time of interception of the various requests directed toward a given content. For instance, the mean and the standard deviation are determined for deriving a time interval where the content is the most probably required.

In some embodiments, it is decided that there is saturation of the forward communication link and/or the return communication link when the remaining available capacity on the communication links is below a predetermined threshold.

In some embodiments, the context comprises geographical information representative of a geographical location where the content is required by the at least one terminal. The at least one piece of data is downloaded from the content server at time slots before having the geographical location being within a coverage area of the satellite during one of its revolution.

Thus, the load of the communication channels is averaged over the geographical locations on earth covered by the satellite.

In some embodiments, the geographical information is determined based on a location of the satellite when the at least one request is intercepted.

Thus, the time information is easily determined, e.g. by performing a statistic on the location of the satellite when the various requests directed toward a given content are intercepted.

In some embodiments, the determining of the context implements an artificial intelligence for analyzing the at least one request.

For instance, the artificial intelligence is implemented through a neural network (e.g. such as deep neural networks, deep belief networks, recurrent neural networks, convolutional neural networks, etc.) which is trained e.g. by implementing a deep learning method.

In some embodiments, the content server is embedded within a content delivery network. The at least one request is according to the internet protocol.

For instance, the content delivery network is based on a 3GPP (for "3rd Generation Partnership Project") 5G core network.

In some embodiments, the constellation of communication satellites is a Low Earth Orbit constellation. For instance, a constellation of satellites with an altitude between 500 and 2000 km.

Another aspect of the present disclosure relates to a method for delivering at least one piece of data representative of a content available at a content server connected to a constellation of communication satellites. Such method comprises:
  storing the at least one piece of data in a data storage device by implementing a method for storing as disclosed above (in any of its embodiments);
  intercepting a request for the content transmitted by the given terminal equipment to the satellite of the constellation of communication satellites;
  extracting the at least one piece of data from the data storage device responsive to the interception of the request; and
  transmitting the at least one piece of data extracted from the data storage device to the given terminal.

When accessing the content, the saturation of the communication channels between, on one hand, the given terminal and the satellite or, on the other hand, between the content server and the satellite, is thus avoided or at least reduced. Furthermore, the latency for accessing the content is reduced.

In some embodiments, the method for delivering comprises, responsive to the interception of the request, implementing an authentication protocol of the given terminal delivering an authentication information. The extracting the at least one piece of data from the data storage device and the transmitting the at least one piece of data extracted from the data storage device being implemented when the authentication information is representative of a positive authentication of the given terminal.

Thus, the access to the data stored in the data storage device is secured.

In some embodiments, the authentication protocol is an Authentication, Authorization and Accounting protocol.

For instance, the authentication protocol is based on the RADIUS (for "Remote Authentication Dial-In User Service") protocol or to the Diameter protocol.

Another aspect of the present disclosure relates to a computer program product comprising program code instructions for implementing the above-mentioned method for storing at least one piece of data (in any of its different embodiments) and/or for implementing the above-mentioned method for delivering at least one piece of data (in any of its different embodiments), when said program is executed on a computer or a processor.

Another aspect of the present disclosure relates to a device for storing at least one piece of data. Such a device is configured for implementing the method for storing at least one piece of data according to the present disclosure (in any of its different embodiments). Thus, the features and advantages of this device are the same as those of the method for storing at least one piece of data described above. Therefore, they are not detailed any further.

Another aspect of the present disclosure relates to a device for delivering at least one piece of data. Such a device is configured for implementing the method for delivering at least one piece of data according to the present disclosure (in any of its different embodiments). Thus, the features and advantages of this device are the same as those of the method for delivering at least one piece of data described above. Therefore, they are not detailed any further.

4. BRIEF DESCRIPTION OF THE DRAWINGS

Other features and advantages of embodiments shall appear from the following description, given by way of indicative and non-exhaustive examples and from the appended drawings, of which:

5. DETAILED DESCRIPTION

In all of the figures of the present document, the same numerical reference signs designate similar elements and steps.

The disclosed technique relates to a method for storing at least one piece of data representative of a content available at a content server connected to a constellation of communication satellites. More particularly, a context wherein the content is usually required by terminals connected to the constellation of communication satellites is determined. For instance, such context is representative of the time such content is usually required (e.g. what time of the day for a daily TV show, etc.), or in which geographical location on earth the content is required (e.g. for a content in a given language, for a sport event that involves national teams, etc.). The determination of the context is based on the request for the content made by the terminals in question. Consequently, the at least one piece of data can be downloaded from the content server in a data storage in anticipation, e.g. at time slots where there is spare bandwidth, for subsequent delivery to a given terminal upon request. Doing so, saturation of the communication channels is avoided, or at least reduced, during a subsequent access to the content.

Figure 1:
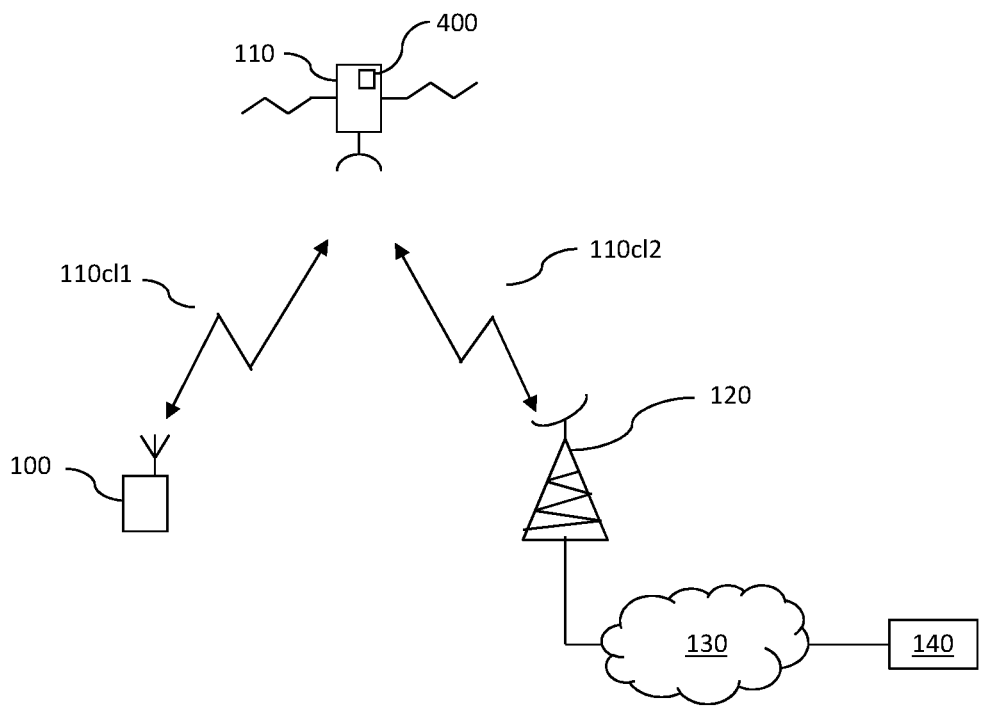
FIG. 1 illustrates a user terminal equipment connected to a communication satellite and requiring a content available at a content server according to one embodiment of the present disclosure.

Referring now to FIG. 1, we illustrate a terminal equipment 100 connected to a communication satellite 110 and requiring a content (e.g. a multimedia content, a video content, etc.) available at a content server 140 according to one embodiment of the present disclosure.

For instance, the satellite 110 is part of a constellation of satellites dedicated to a global coverage for internet access on earth, e.g. a LEO constellation of satellites comprising satellites with an altitude between 500 and 2000 km.

The terminal equipment 100 (e.g. a computer including a modem configured for communicating with the satellite 110, a dedicated terminal for communicating with the satellite 110, etc.) is connected to a communication network 130 through a first communication link 110c/1 between the terminal 100 and the satellite 110 and a second communication link 110c/2 between the satellite 110 and a earth station 120. The earth station 120 is connected to the communication network 130.

The first communication link 110c/1 comprises a forward communication link for transmission of data from the terminal equipment 100 to the satellite 110 and a return communication link for transmission of data from the satellite 110 to the terminal equipment 100.

The second communication link 110c/2 comprises a forward communication link for transmission of data from the earth station 120 to the satellite 110 and a return communication link for transmission of data from the satellite 110 to the earth station 120.

In other embodiments, the communication link between the terminal equipment 100 and the communication network 130 goes through a plurality of satellites of the constellation of satellites before going to the earth station 120.

Back to FIG. 1, the content server 140 is directly connected to the communication network 130. For instance, the content server 140 is imbedded in a content delivery network based on the technology of the communication network 130. For instance, the communication network 130 implements a 5G core network.

The satellite 110 comprise a device 400 configured for implementing the method for storing at least one piece of data and/or the method for delivering at least one piece of data according to the disclosure (according to any of the embodiments disclosed below in relation with FIGS. 2 and 3).

In other embodiments, the terminal 100 is connected to a first communication network (e.g. a 5G 3GPP network, a 3GPP network of any other generation, etc.) that is in turn connected to a ground station that forwards the requests sent by the terminal 100 to the satellite 110. In such embodiment, the device 400 can be implemented whether in the satellite 110 or within the first network the terminal equipment 100 is connected to.

Figure 2:
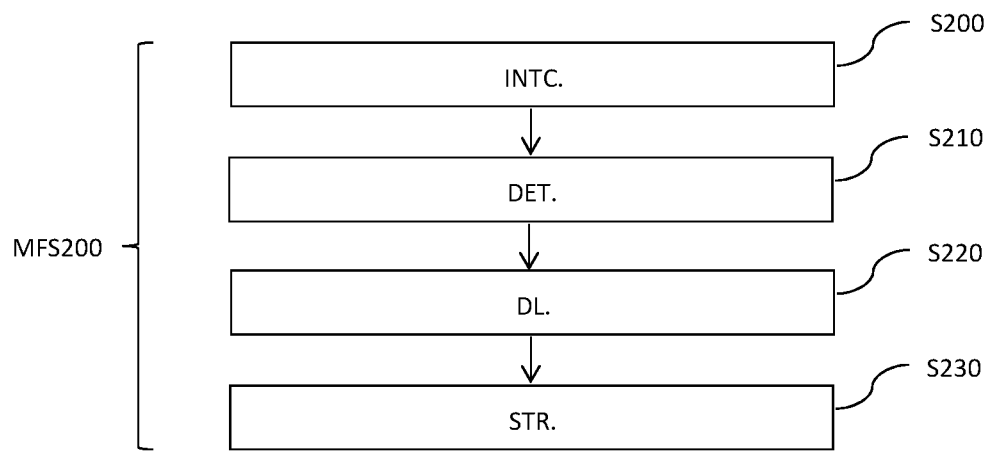
FIG. 2 illustrates a flowchart of a method for storing at least one piece of data representative of the content required by a user terminal according to one embodiment of the present disclosure.

Referring now to FIG. 2, we illustrate a method for storing at least one piece of data representative of the content required by a user terminal equipment according to one embodiment of the present disclosure. Such method is enforced by the device 400 as discussed above and detailed below in relation with FIG. 4.

In a step S200, the device 400 intercepts at least one request for a content transmitted by at least one terminal equipment connected to the constellation of satellite.

For instance, one request for the content is sent by the terminal equipment 100 and other requests for the same content are sent by other terminals also connected to the constellation of satellite.

Here, by intercepting the at least one request, we mean that the requests in question may not be initially sent to the device 400 itself. For instance, such requests may follow a defined protocol (e.g. the internet protocol) that make then follow a path defined by such protocol in the network. In that case, the device 400 intercepts the requests that are not initially intended to be sent to the device 400 (e.g. by programming a forwarding at the level of a given node along the path followed by the requests). In other embodiments, the device 400 directly receives the at least one request.

In the embodiment of FIG. 1, the at least one request is sent toward the network 130 passing by the first 110c/1 and second 110c/2 communication links. In that case, the device 400 intercepts the at least one request when the at least one request is received by the satellite 110. In other embodiments discussed above in relation with FIG. 1 wherein the device 400 is implemented within the first communication network the terminal equipment 100 is connected to, the device 400 intercepts the request when passing through the first communication network in question.

Back to FIG. 2, in a step S210, the device 400 determines, based on the at least one request, a context wherein the content is required by the at least one terminal equipment connected to the constellation of satellite. Such context comprises various information representative of parameters associated to the at least one request for the content as detailed below.

In a step S220, the device 400 downloads the at least one piece of data from the content server 140 at time slots function of the context.

In a step S230, the device 400 stores in a data storage device the at least one piece of data downloaded from the content server for subsequent delivery to a given terminal upon request. In some embodiments, the data storage device is included in the device 400, e.g. in the non-volatile memory 403. In other embodiments, the data storage device is not included in the device 400, e.g. in the form of an external memory (hard disk drive, flash memory, etc.).

In some embodiments, the context comprises a time information that is representative of when the content is required by the at least one terminal.

In that case, the at least one piece of data is downloaded from the content server 140 at time slots with available communication bandwidth in the forward communication link of the second communication link 110c/2 and/or in a return communication link of the first communication link 110c/1 when the time information is representative that the content is required by the at least one terminal at time slots with saturation of the forward communication link and/or with saturation of the return communication link in question. Thus, the load of the communication channels is averaged in time.

In some embodiments, it is decided that there is saturation of the forward communication link and/or of the return communication link when the remaining available capacity on the communication links in question is below a predetermined threshold (e.g. 20%, 10%, 5%, etc.).

In some embodiments, the time information is determined based on a time when the at least one request is intercepted by the device 400, e.g. by performing a statistic on the time of interception of the various requests for the content. For instance, the mean and the standard deviation of the time of interception of the requests are determined for deriving a time interval where the content is the most probably required by the at least one terminal.

In some embodiments the context comprises a geographical information representative of a geographical location where the content is required by the at least one terminal. In that case, the at least one piece of data is downloaded from the content server at time slots before having the geographical location being within a coverage area of the satellite 110 during one of its revolution. Thus, the load of the communication channels is averaged over the geographical locations on earth covered by the satellite.

In some embodiments, the geographical information is determined based on a location of the satellite 110 (e.g. based on GPS data) when the at least one request is intercepted. For instance, the geographical information is determined by performing a statistic on the locations in questions.

In some embodiments, the context is determined by implementing an artificial intelligence for analyzing the at least one request, thus achieving a high accuracy in the analysis. Indeed, current hardware developments have enabled the deep learning technique to run on communication infrastructures. In the same way, artificial intelligence has shown excellent performances in various industrial applications such as image analysis or data mining, which is most relevant for determining the context within the meaning of the present application.

For instance, the artificial intelligence is implemented through a neural network (e.g. such as a deep neural network, a deep belief network, a recurrent neural network, a convolutional neural network, etc.) which is trained by implementing a machine learning method (e.g. a deep learning method which can be supervised, semi-supervised or unsupervised). Consequently, based on information relating to the at least one request the artificial intelligence can determine the various components of the context. For instance, the artificial intelligence can use the time when the at least one request is intercepted by the device 400 or the geographical location where the content is required by the at least one terminal as discussed above. In other variants, the artificial intelligence can use alternative or additional data. For instance, in case the satellite 110 comprises equipment allowing to take pictures of the earth, the artificial intelligence can analyze such picture taken at the time the device 400 intercepts the at least one request and determine the country from where the at least one request was transmitted.

Figure 3:
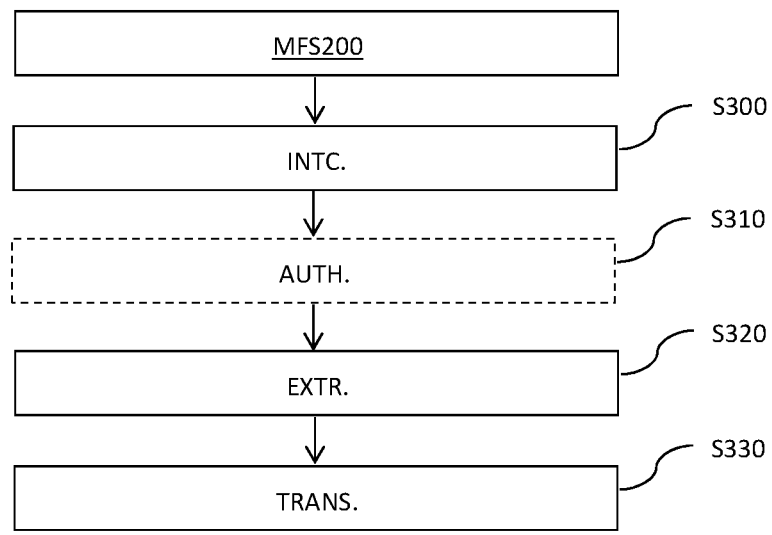
FIG. 3 illustrates a flowchart of a method for delivering at least one piece of data representative of the content required by a user terminal according to one embodiment of the present disclosure.

Referring now to FIG. 3, we illustrate a method for delivering at least one piece of data representative of the content required by a user terminal equipment according to one embodiment of the present disclosure.

More particularly, the method for delivering comprises a phase P200 that comprises the steps S200, S210, S220 and S230 of the method for storing in any of the embodiments discussed above in relation with FIG. 2. Such method for delivering is thus also enforced by the device 400 (in some of its embodiments).

In a step S300, the device 400 intercepts a new request for the content transmitted to the satellite 110 by a given terminal equipment, e.g. the terminal equipment 100.

In a step S310, the device 400, responsive to the interception of the new request, implements an authentication protocol of the given terminal equipment delivering an authentication information. In some embodiments, the authentication protocol is an Authentication, Authorization and Accounting protocol (e.g. based on the RADIUS protocol or to the Diameter protocol).

Back to FIG. 3, if the authentication information is representative of a positive authentication of the given terminal equipment, in a step S320, the device 400 extracts the at least one piece of data from the data storage device and transmits the at least one piece of data extracted from the data storage device to the given terminal equipment in a step S330.

Thus, when accessing the content, the saturation of the communication channels between the given terminal and the satellite 110 and/or (depending where the device 400 is located, i.e. in the satellite 110 as in the embodiment of FIG. 1, or in the first network as discussed above in relation with FIG. 1) between the content server 140 and the satellite 110, is thus avoided or at least reduced. Furthermore, the latency for accessing the content is reduced.

In other embodiments, the step S310 is not implemented and the steps step S320 and S330 are implemented directly responsive to the interception of the new request. In that case, there is no authentication of the given terminal equipment performing the new request. Latency is thus further reduced in that case.

Figure 4:
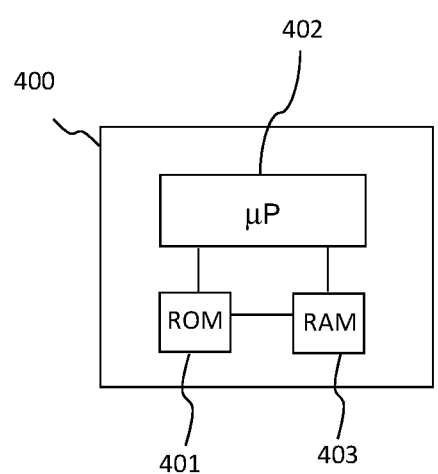
FIG. 4 illustrates an exemplary device that can be used for implementing the method of FIG. 2 and/or the method of FIG. 3.

Referring now to FIG. 4, we illustrate the structural blocks of the exemplary device 400 that can be used for implementing the method for storing at least one piece of data and/or the method for delivering at least one piece of data according to the disclosure (according to any of the embodiments disclosed above).

In an embodiment, a device 400 comprises a non-volatile memory 403 (e.g. a read-only memory (ROM), a hard disk, a flash memory, etc.), a volatile memory 401 (e.g. a random-access memory or RAM) and a processor 402. The non-volatile memory 403 is a non-transitory computer-readable carrier medium. It stores executable program code instructions, which are executed by the processor 402 in order to enable implementation of the methods described above (method for storing at least one piece of data and/or the method for delivering at least one piece of data) in its various embodiment disclosed in relationship with FIG. 2 and FIG. 3.

Upon initialization, the aforementioned program code instructions are transferred from the non-volatile memory 403 to the volatile memory 401 so as to be executed by the processor 402. The volatile memory 401 likewise includes registers for storing the variables and parameters required for this execution.

All the steps of the method for storing at least one piece of data and/or the method for delivering at least one piece of data according to the disclosure may be implemented equally well:

- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

In some embodiments, the device 400 is implemented into the satellite 110.

In some embodiments, the device 400 is implemented into a network node (e.g. a node of a 5G network).

The invention claimed is:

1. A method for storing at least one piece of data representative of a content available at a content server (140) connected to a constellation of communication satellites, the method comprising:
intercepting (S200) at least one request for said content transmitted by at least one terminal equipment (100) connected to said constellation of communication satellites, said at least one request being transmitted to a satellite (110) of said constellation of communication satellites;
determining (S210), based on said at least one request, a context wherein said content is required by said at least one terminal and wherein said context comprises geographical information representative of a geographical location where said content is required by said at least one terminal;
downloading (S220) said at least one piece of data from said content server at a location on earth at time slots function of said context; and
storing (S230) in a data storage device said at least one piece of data downloaded from said content server for subsequent delivery to a given terminal upon request.

2. The method for storing according to claim 1, wherein said context comprises time information representative of when said content is required by said at least one terminal, and wherein said at least one piece of data is downloaded from said content server at time slots with available communication bandwidth in a forward communication link between said server and said satellite and/or in a return communication link between said satellite and said at least one terminal when said time information is representative that said content is required by said at least one terminal at time slots with saturation of said forward communication link and/or in said return communication link.

3. The method for storing according to claim 2, wherein said time information is determined based on a time when said at least one request is intercepted.

4. The method for storing according to claim 2, wherein it is decided that there is saturation of said forward communication link and/or said return communication link when the remaining available capacity on said communication links is below a predetermined threshold.

5. The method for storing according to claim 1, wherein said at least one piece of data is downloaded from said content server at the time slots before having said geographical location being within a coverage area of said satellite during one of its revolution.

6. The method for storing according to claim 5, wherein said geographical information is determined based on a location of said satellite when said at least one request is intercepted.

7. The method for storing according to claim 1, wherein said determining said context implements an artificial intelligence for analyzing said at least one request.

8. The method for storing according to claim 1, wherein said content server is embedded within a content delivery network, and wherein said at least one request is according to the Internet Protocol.

9. The method for storing according to claim 1, wherein said constellation of communication satellites is a Low Earth Orbit constellation.

10. A method for delivering at least one piece of data representative of a content available at a content server connected to a constellation of communication satellites, the method comprising:
storing said at least one piece of data in a data storage device by implementing a method for storing according to claim 1;
intercepting (S300) a request for said content transmitted by said given terminal equipment to said satellite of said constellation of communication satellites;
extracting (S320) said at least one piece of data from said data storage device responsive to said interception of said request; and
transmitting (S330) said at least one piece of data extracted from said data storage device to said given terminal.

11. The method for delivering according to claim 10, comprising, responsive to said interception of said request, implementing an authentication protocol (S310) of said given terminal delivering an authentication information,
said extracting said at least one piece of data from said data storage device and said transmitting said at least one piece of data extracted from said data storage device being implemented when said authentication information is representative of a positive authentication of said given terminal.

12. The method for delivering according to claim 10, wherein said authentication protocol is an Authentication, Authorization and Accounting protocol.

13. A device (400) for storing at least one piece of data representative of a content available at a content server (140) connected to a constellation of communication satellites, comprising:
a processor (402) or a dedicated computing machine configured for:
intercepting at least one request for said content transmitted by at least one terminal equipment (100) connected to said constellation of communication satellites, said at least one request being transmitted to a satellite (110) of said constellation of communication satellites;
determining, based on said at least one request, a context wherein said content is required by said at least one terminal and wherein said context comprises geographical information representative of a geographical location where said content is required by said at least one terminal;
downloading said at least one piece of data from said content server at a location on earth at time slots function of said context; and
storing in a data storage device said at least one piece of data downloaded from said content server for subsequent delivery to a given terminal upon request.

14. The device according to claim 13 wherein said processor or said dedicated computing machine is further configured for:
intercepting a request for said content transmitted by said given terminal equipment to said satellite of said constellation of communication satellites in destination to said server;

extracting said at least one piece of data from said data storage device responsive to said interception of said request; and transmitting said at least one piece of data extracted from said data storage device to said given terminal.

15. A non-transitory computer-readable storage medium having data stored therein representing software executable by a processor, the software including instructions to implement the method according to claim 1.

\* \* \* \* \*